United States Patent
Liu et al.

(10) Patent No.: US 11,651,232 B2
(45) Date of Patent: May 16, 2023

(54) MONTE CARLO MARKOV CHAIN BASED QUANTUM PROGRAM OPTIMIZATION

(71) Applicant: International Business Machines Corporation, Armonk, NY (US)

(72) Inventors: Peng Liu, Yorktown Heights, NY (US); Shaohan Hu, Yorktown Heights, NY (US); Marco Pistoia, Amawalk, NY (US); Richard Chen, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1132 days.

(21) Appl. No.: 16/052,348

(22) Filed: Aug. 1, 2018

(65) Prior Publication Data
US 2020/0042882 A1    Feb. 6, 2020

(51) Int. Cl.
*G06N 3/126*    (2023.01)
*G06F 8/41*    (2018.01)
*G06F 17/18*    (2006.01)
*G06N 10/00*    (2022.01)

(52) U.S. Cl.
CPC ............ *G06N 3/126* (2013.01); *G06F 8/443* (2013.01); *G06F 17/18* (2013.01); *G06N 10/00* (2019.01)

(58) Field of Classification Search
CPC ........ G06N 3/126; G06N 10/00; G06F 8/443; G06F 17/18
See application file for complete search history.

(56) References Cited

U.S. PATENT DOCUMENTS

| | | | |
|---|---|---|---|
| 8,024,209 B2 | 9/2011 | Berstis et al. | |
| 8,117,288 B2 | 2/2012 | Bhanot et al. | |
| 8,788,450 B2 | 7/2014 | Ulyanov | |
| 9,838,141 B2 | 12/2017 | Martin | |
| 2015/0170054 A1* | 6/2015 | Allen | G09B 7/00 706/11 |

(Continued)

OTHER PUBLICATIONS

Le et al., "Finding Deep Compiler Bugs via Guided Stochastic Program Mutation," OOPSLA'15, Oct. 25-30, 2015, Pittsburgh, PA, USA (Year: 2015).*

(Continued)

*Primary Examiner* — Miranda M Huang
*Assistant Examiner* — Yao David Huang
(74) *Attorney, Agent, or Firm* — Garg Law Firm, PLLC; Rakesh Garg; Erik Johnson (57) ABSTRACT

From a quantum program a first mutant is generated using a processor and a memory, where the first mutant is a randomly-generated transformation of the quantum program. A quality score, a correctness distance, and a probability of acceptance corresponding to the first mutant are computed. An acceptance corresponding to the first mutant is determined according to the probability of acceptance. Upon determining that an acceptance of the first mutant corresponding to the probability of acceptance exceeds an acceptance threshold, the quantum program is replaced with the first mutant. Upon determining that the quality score exceeds a storage threshold and that the correctness distance is zero, the first mutant is stored. These actions are iterated until reaching an iteration limit.

18 Claims, 8 Drawing Sheets

(56) References Cited

U.S. PATENT DOCUMENTS

| | | | |
|---|---|---|---|
| 2017/0330101 A1 | 11/2017 | Hastings et al. | |
| 2018/0260245 A1* | 9/2018 | Smith | G06N 10/00 |

OTHER PUBLICATIONS

Schkufza et al., "Stochastic Superoptimization," ASPLOS'13, Mar. 16-20, 2013, Houston, Texas, USA (Year: 2013).*

Chang et al., "An Adaptive Sampling Algorithm for Solving Markov Decision Processes," Operations Research, Jan.- Feb. 2005, vol. 53, No. 1 (Jan.-Feb. 2005), pp. 126-139 ("Chang"). (Year: 2005).*

Schkufza et al., "Stochastic Program Optimization," Communications of the ACM, Feb. 2016, vol. 59, No. 2 (Year: 2016).*

Brunel et al., "Learning to Superoptimize Programs," arXiv:1611.01787v3 [cs.LG] Jun. 28, 2017 (Year: 2017).*

Smith et al., "A Practical Quantum Instruction Set Architecture," arXiv:1608.03355v2 [quant-ph] Feb. 17, 2017 (Year: 2017).*

Del Duce et al., "Design and optimisation of quantum logic circuits for a three-qubit Deutsch-Jozsa algorithm implemented with optically-controlled, solid-state quantum logic gates," arXiv:0910.1673 [quant-ph] Oct. 9, 2009 (Year: 2009).*

Murray, "Driving Markov chain Monte Carlo with a dependent random stream," arXiv:1204.3187v1 [stat.CO] Apr. 14, 2012 (Year: 2012).*

Evans, "Dissecting a Quantum Program," Proceedings of Student-Faculty Research Day, CSIS, Pace University, May 4, 2018 (Year: 2018).*

Metodi et al., "Design and implementation of a quantum compiler," Proc. SPIE 7702, Quantum Information and Computation VIII, 77020S (Apr. 16, 2010) (Year: 2010).*

Hwang et al., "Application of simulated annealing (SA) to the synthesis of heterogeneous catalytic reactor," Korean J. Chem. Eng., 29(1), 25-35 (2012) (Year: 2012).*

Dorit Aharonov, and Amnon Ta-Shma, "Adiabatic quantum state generation and statistical zero knowledge," STOC '03 Proceedings of the thirty-fifth annual ACM symposium on Theory of computing, pp. 20-29.

Simon L. Cotter, Gareth O. Roberts, Andrew M. Stuart, and David White, "MCMC methods for functions: modifying old algorithms to make them faster," Statistical Science (2013): pp. 424-446.

Andrei Lapets, and Martin Roetteler, "Abstract resource cost derivation for logical quantum circuit descriptions," FPCDSL '13 Proceedings of the 1st annual workshop on Functional programming concepts in domain-specific languages, pp. 35-42.

* cited by examiner

MONTE CARLO MARKOV CHAIN BASED QUANTUM PROGRAM OPTIMIZATION

TECHNICAL FIELD

The present invention relates generally to a method, system, and computer program product for quantum programming. More particularly, the present invention relates to a method, system, and computer program product for Monte Carlo Markov Chain based quantum program optimization.

BACKGROUND

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical, or conventional, computers. A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing. Herein, a qubit is the physical carrier of quantum information. A qubit is the quantum version of a bit in classical computing, and can have quantum states of |0>, |1>, or the linear combination of both.

Quantum computing can often be used to solve problems more quickly than in conventional computing. For example, one quantum algorithm is Grover's Search, which accomplishes searching through an unordered list of N items with fewer lookups than is the case in conventional computing.

Quantum gates are the elementary building blocks for quantum computation, acting on qubits the way classical logic gates act on bits, one and two at a time, to change qubit states in a controllable way. An X gate inverts the state of a single qubit, much like a NOT gate inverts the state of a single bit in classical computing. An H gate, or Hadamard gate, puts a single qubit into a state of superposition, a combination of the 0 and 1 quantum states. The qubit only resolves to a definite state when measured. For example, when provided with an input having a quantum state of 0, within the Hadamard gate the quantum state is in superposition, but the output has a 50 percent probability of being in the quantum 0 state and a 50 percent probability of being in the quantum 1 state. Other single-qubit gates alter the qubit state in other defined ways.

Multi-qubit gates implement gates that perform conditional logic between qubits, meaning the state of one qubit depends on the state of another. For example, a Controlled-NOT, or CNOT gate, has two qubits, a target qubit and a control qubit. If the control qubit is in the 1 quantum state, the CNOT gate inverts the state of the target qubit. If the control qubit is in the 0 quantum state, the CNOT gate does not change the state of the target qubit.

Multiple qubits can also be entangled. Two or more qubits are entangled when, despite being too far apart to influence one another, they behave in ways that are individually random, but also too strongly correlated to be explained by supposing that each object is independent from the other. As a result, the combined properties of an entangled multi-qubit system can be predicted, but the individual outcome of measuring each individual qubit in such a system cannot.

Similar to conventional computing, quantum computing gates can be assembled into larger groups, called quantum programs, to perform more complicated operations. For example, a SWAP gate, which exchanges the states of a pair of qubits, can be constructed from three CNOT gates.

Quantum programs can perform some operations in parallel, and some in series. The length of the longest series in the program is also referred to as the depth of the quantum program. For example, the three CNOT gates comprising a SWAP gate are arranged in series, giving a depth of 3. Programs with a shallower depth take less execution time and provide better performance, so are preferred.

Conventional computers do not have to be hand-programmed with specific instruction steps, such as those provided in processor-specific assembly languages. Instead, programmers write hardware-independent code in a higher-level language, and a compiler translates this code into assembly language for execution on a specific processor. Similarly, in quantum computing programmers do not have to specify individual gates. Instead, programmers can write higher-level code in a higher-level language. A compiler parses this code and maps it into a quantum program. Finally, a quantum processor executes the quantum program. Quantum programmers can also make use of already-programmed libraries, for use in solving problems in areas such as chemistry, artificial intelligence, and optimization.

However, the quantum program produced by a compiler is not necessarily the most efficient quantum program capable of producing the same result. Just as optimizing compilers optimize compiled code for conventional processors, so too an optimizing compiler is needed to optimize quantum programs meant to run on quantum processors. Here, optimizing refers to refining a quantum program so that its execution incurs lower cost, typically by taking less time to execute.

Compiler optimizations for classical programs, such as classical dataflow based optimizations and stochastic optimizations, do not apply to quantum programs because outputs from the two types of programs differ. For classical programs, the program state is deterministic and the output is simply the program state when execution completes. For quantum programs, the program state represents a probability distribution of all possible outcomes, and the output is merely a sample from the distribution. As a result, outputs change from run to run non-deterministically.

Existing techniques for optimizing quantum programs follow ad-hoc heuristics, relying on correctness-preserving rules or templates specified by human experts. These techniques demand great manual efforts from the experts, especially given that quantum programs are hard to understand. As well, human knowledge inevitably limits the scope of the optimizations since human experts are unlikely to be able to specify all possible optimization rules. Additionally, such techniques must preserve program correctness at every step, so cannot achieve aggressive optimizations that temporarily sacrifice correctness at intermediate steps while ensuring correctness at the final step.

As a result, what is needed in the art is a technique for optimizing quantum programs that does not rely on ad-hoc heuristics and also preserves program correctness.

SUMMARY

The illustrative embodiments provide a method, system, and computer program product. An embodiment includes a method that generates, from a quantum program using a processor and a memory, a first mutant, the first mutant including a randomly-generated transformation of the quantum program. The method computes a quality score, a correctness distance, and a probability of acceptance corresponding to the first mutant. The method determines, according to the probability of acceptance, an acceptance corresponding to the first mutant. The method replaces, upon determining that an acceptance of the first mutant corresponding to the probability of acceptance exceeds an acceptance threshold, the quantum program with the first mutant. The method stores, upon determining that the quality score exceeds a storage threshold and that the correctness distance is zero, the first mutant. The method iterates these actions, until reaching an iteration limit. Thus, the embodiment generates a more optimized quantum program producing the same results as the original in a shorter time, with faster execution and using fewer resources.

In another embodiment, a method also computes the quality score using an inverse proportionality function on an overall cost. Thus, the method provides a particular manner of generating the more optimized quantum program.

In another embodiment, cost_diff comprises the overall cost corresponding to the mutant minus the overall cost corresponding to the original program. The probability of acceptance is one when cost_diff is a negative number. The probability of acceptance is $e^{\wedge}$ (-beta*cost_diff) when cost_diff is a positive number, wherein beta is a tunable parameter. Thus, the method provides a particular manner of generating the more optimized quantum program.

In another embodiment, the overall cost further includes a correctness cost and a performance cost. Thus, the method provides a particular manner of generating the more optimized quantum program.

In another embodiment, a method also computes the probability of acceptance using a direct proportionality function on the quality score. Thus, the method provides a particular manner of generating the more optimized quantum program.

In another embodiment, quality_diff comprises the quality score corresponding to the mutant minus the quality score corresponding to the original program. The probability of acceptance is one when quality_diff is a positive number. The probability of acceptance is $e^{\wedge}$ (beta*quality_diff) when quality_diff is a negative number, wherein beta is a tunable parameter. Thus, the method provides a particular manner of generating the more optimized quantum program.

In another embodiment, a method also terminates the iteration upon the numbered of stored mutants exceeding a threshold. Thus, the method provides a particular manner of generating the more optimized quantum program.

In another embodiment, a method also terminates the iteration upon determining that the quality score exceeds a storage threshold and that the correctness distance is zero.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that the presently available tools or solutions do not address these needs or provide adequate solutions for these needs. The illustrative embodiments used to describe the invention generally address and solve the above-described problems and other problems related to Markov Chain Monte Carlo based quantum program optimization.

An embodiment can be implemented as a software application. The application implementing an embodiment can be configured as a modification of an existing quantum programming compiler system, as a separate application that operates in conjunction with an existing quantum programming compiler system, a standalone application, or some combination thereof.

Particularly, some illustrative embodiments provide a method by which a quantum program is transformed into another quantum program having equivalent output, but better performance, than the original.

An embodiment receives a program as an input. The embodiment then varies the program and determines whether the revised program is both better and still correct. Variations are also referred to as mutants. An embodiment creates each mutant by applying one of six basic, randomly chosen, transformations. The first transformation inserts, at a random program point, an operation synthesized by randomly choosing a type of gate and the qubits the gate operates on. The second transformation removes a randomly chosen operation. The third transformation swaps two randomly chosen operations. The fourth transformation randomly chooses an existing operation and replaces the gate with a different gate operating on the same number of qubits. The fifth transformation randomly chooses an existing operation and replaces the qubits with other qubits. The sixth transformation randomly chooses an existing operation and replaces it with a different randomly synthesized operation.

However, finding optimizations by evaluating all the possible transformations is not an efficient process. Instead, an embodiment uses a Monte Carlo Markov Chain method. To use this method, an embodiment constructs a Markov chain, in which each state in the Markov chain represents a mutant. An embodiment determines an overall cost for each mutant. The overall cost is a measure of the quality of the mutant; i.e. a better mutant has a lower cost.

Alternatively, an embodiment determines and evaluates mutants in terms of a quality score instead of a cost, where the quality score is the inverse of the cost. For example, a cost of 10 on a 0-100 scale equates to a quality score of 90 on the same scale. In other words, a cost measures how bad a mutant is, while a quality score measures how good a mutant is.

The overall cost has two components: a correctness cost and a performance cost. An embodiment sums the correctness cost and the performance cost to obtain an overall cost. Another embodiment computes overall cost using the expression overall_cost=a*performance_cost+b*correctness cost, where a and b both represent constants. For example, a can be set to 2 and b can be set to 3. Alternatively, an embodiment combines the two costs in other ways to obtain an overall cost.

An embodiment measures equivalent output, also referred to as correctness, using amplitude vectors. Unlike classical computing, in which program outputs can simply be compared, in quantum computing outputs change from run to run non-deterministically. Amplitude vectors, however, which mathematically represent qubit outputs, are deterministic from run to run. As a result, if a revised quantum program results in an amplitude vector equivalent to the amplitude vector that results from the original quantum program, the revised program is considered correct.

To compare amplitude vectors, an embodiment determines the Hamming distance between them. Hamming distance measures the number of substitutions required to change one amplitude vector into the other. As a result, a pair of amplitude vectors that differ in only one entry will have a Hamming distance of 1, and a pair of amplitude vectors that differ in two entries will have a Hamming distance of 2. A pair of amplitude vectors that are equivalent will have a Hamming distance of 0, and be considered correct. The correctness cost is directly proportional to the Hamming distance between amplitude vectors.

The performance cost is a measure of the quality of the mutant. One embodiment determines the performance cost by subtracting the number of gates in the original program from the number of gates in the mutant program. For example, if the original program had 10 operations and the current mutant has 12 operations, the performance cost is 2—worse than the original. On the other hand, if the original program had 10 operations and the current mutant has 8 operations, the performance cost is −2, so better than the original. Making use of the simplifying assumption that every type of gate operation takes the same amount of time, programs with fewer gates are preferred because they take less execution time than programs having more gates.

Another embodiment evaluates performance cost in terms of depth, and computes performance cost by subtracting the number of gates in the original program from the number of gates in the mutant program. For example, if the original program had a depth of 7 and the current mutant has a depth of 4, the performance cost would be −3, better than the original. A program having a smaller, or shallower, depth takes less execution time and hence is preferred. Performance is proportional to program depth, and cost is inversely proportional to program depth. As a result, a program having a smaller depth will have better performance, or equivalently a lower cost. Depth is a more accurate measure of performance cost than the number of operations, because two operations may execute in parallel.

To optimize a quantum program, an embodiment starts with an initial, original program and introduces one random change, using a random one of the transformations described herein. For example, an embodiment could replace one gate in the original program with a different gate. We refer to this first change as mutant 1. An embodiment then computes the overall cost of mutant 1. In an embodiment, the performance cost and correctness cost of mutant 1 determine the resulting overall cost of mutant 1. Alternatively, an embodiment makes more than one random change at a time, resulting in a more coarse-grained search that might miss some useful mutants.

Next, an embodiment decides whether to accept or reject mutant 1, depending on the overall cost or quality score. In particular, the acceptance decision is based on a probability determination. Guiding the search in this manner allows an embodiment to incorporate a temporary cost increase, including an output that may not be correct, to get to a potentially better mutant later in the process. However, only optimizations that are also correct are considered usable optimizations.

In an embodiment, if mutant 1 has a lower cost than the original program, mutant 1 is accepted. If mutant 1 has a higher cost than the original program, the probability of accepting a mutant is $e^{\wedge}$ (-beta*cost_diff), where beta is a tunable parameter and cost_diff represents the overall cost of the original program subtracted from the overall cost of mutant 1. For example, suppose beta=0.02, the cost of the original program is 1, and the cost of mutant 1 is 5. Then the probability of acceptance for mutant 1 would be 0.92, or 92 percent.

Alternatively, an embodiment implements the probability of accepting a mutant in terms of differences in quality scores: if mutant 1 has a higher quality score than the original program, mutant 1 is accepted. If mutant 1 has a lower quality score than the original program, the probability of accepting a mutant is $e^{\wedge}$ (beta*quality_diff), where quality_diff represents the quality score of the original program subtracted from the quality score of mutant 1. For example, suppose beta=0.02, the quality score of the original program is 5, and the quality score of mutant 1 is 1. Then the probability of acceptance for mutant 1 would still be 0.92, or 92 percent.

In these expressions, beta can be set to one value during all iterations. Beta can also be varied, in a simulated annealing strategy. For example, the initial value of beta could be low to favor exploration and avoid getting stuck at a local optimum and missing a better global optimum, and then gradually increased to favor exploitation of any optimums that are found over exploration. As one implementation example, beta is initialized as 0.05 and then increased by 0.02 after every 200 iterations. Other probability-based mutant acceptance strategies are also known to those of ordinary skill in the art and contemplated within the scope of the illustrative embodiments.

If an embodiment accepts mutant 1, mutant 1 becomes the basis for generating a new mutant. The embodiment generates mutant 2, by introducing one random change to mutant 1, using a random one of the transformations described herein. If, instead, an embodiment rejects mutant 1, mutant 1 is discarded, and an embodiment generates mutant 2 from the original program. In either case, an embodiment repeats the evaluation process with respect to mutant 2.

As well, if a mutant, for example mutant 1, has a quality score above a threshold, or a cost below a threshold, and is also correct, an embodiment saves that mutant, as well as that mutant's score or cost, in a collection of "good enough" mutants. An embodiment Implements an empirically-chosen threshold that is not impossibly high (so that no mutant is collected) and not so low as to generate too many mediocre mutants, which are unnecessary. Alternatively, an embodiment stores all the mutants having acceptable scores, without regard for correctness, then checks for correctness when evaluating stored mutants at a later time. Correctness checking takes into account the possibility that a mutant with a very good score might also produce incorrect results—an unacceptable optimization of the original program. For example, a mutant that contained no operations would have an extremely high quality score, or an extremely low cost, but would not produce correct results.

An embodiment continues to generate mutants in this manner until an iteration limit is reached. The iteration limit is empirically chosen to produce acceptable results within computational limitations. Once the iteration limit is reached, the application implementing an embodiment stops, and the best mutant in the collection of stored mutants of sufficient quality is chosen. With enough iterations, this best mutant represents a nearly ideal optimization of the original program, while also producing the same output as the original program. For example, an iteration limit can be set to 10,000. Alternatively, several different iteration limits can be chosen, and the results compared to determine the point at which it appears to be very unlikely that any additional "good enough" mutants will be obtained, and the threshold set to that point.

Alternatively, an embodiment continues to generate mutants until a particular number of mutants of sufficient quality have been found, potentially finishing with a shorter run time than when using a fixed number of iterations. Alternatively, an embodiment stops generating mutants when the first "good enough" mutant is found, allowing for a shorter run time at the expense of potentially missing a more optimal solution. As well, one embodiment simply chooses the best mutant according to programmed parameters, while another produces a collection of acceptable mutants for further processing.

An illustrative embodiment implements constraints on the mutant generation process. For example, to minimize application execution resources, an embodiment only generates mutants relating to one or more portions, or sub-programs, of the original program. When generating mutants relating to a sub-program, the selected sub-program should be self-contained, and not entangled with the rest of the program.

An illustrative embodiment includes constraints on mutant generation and mutant acceptance. Such constraints include, for example, restrictions on which gates may be replaced with which other gates. For example, the mutant generation process can replace a single-qubit gate with another single-qubit gate, but cannot replace a single-qubit gate with a gate that operates on multiple qubits. As another example, a gate input, such as q[0], cannot be replaced with another gate input, such as q[1000], that does not exist because the quantum processor the program runs on does not operate on 1001 qubits.

An illustrative embodiment implements checkpoints at various points in the mutant-generation process. If, at a checkpoint, no or an unacceptably low number of mutants have been found, an embodiment adjusts one or more parameters of the mutant generation and evaluation process, such as the number of iterations, the threshold of an "good enough" mutant, beta, or other parameters related to the decision to accept a mutant, and restarts the process from the original program. If further parameter variation does not produce acceptable results either, an embodiment stops. In this case, the original program may already be nearly ideally optimized and the embodiment simply cannot find a more optimized version of the program.

The manner of Monte Carlo Markov Chain based quantum program optimization described herein is unavailable in the presently available methods. A method of an embodiment described herein, when implemented to execute on a device or data processing system, comprises substantial advancement of the functionality of a quantum program by generating a more optimized quantum program producing the same results as the original in a shorter time, with faster execution and using fewer resources.

The illustrative embodiments are described with respect to certain types of quantum programs, quantum gates, qubits, quantum processors, thresholds, mutants, transformations, acceptance criteria, cost and performance evaluations, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
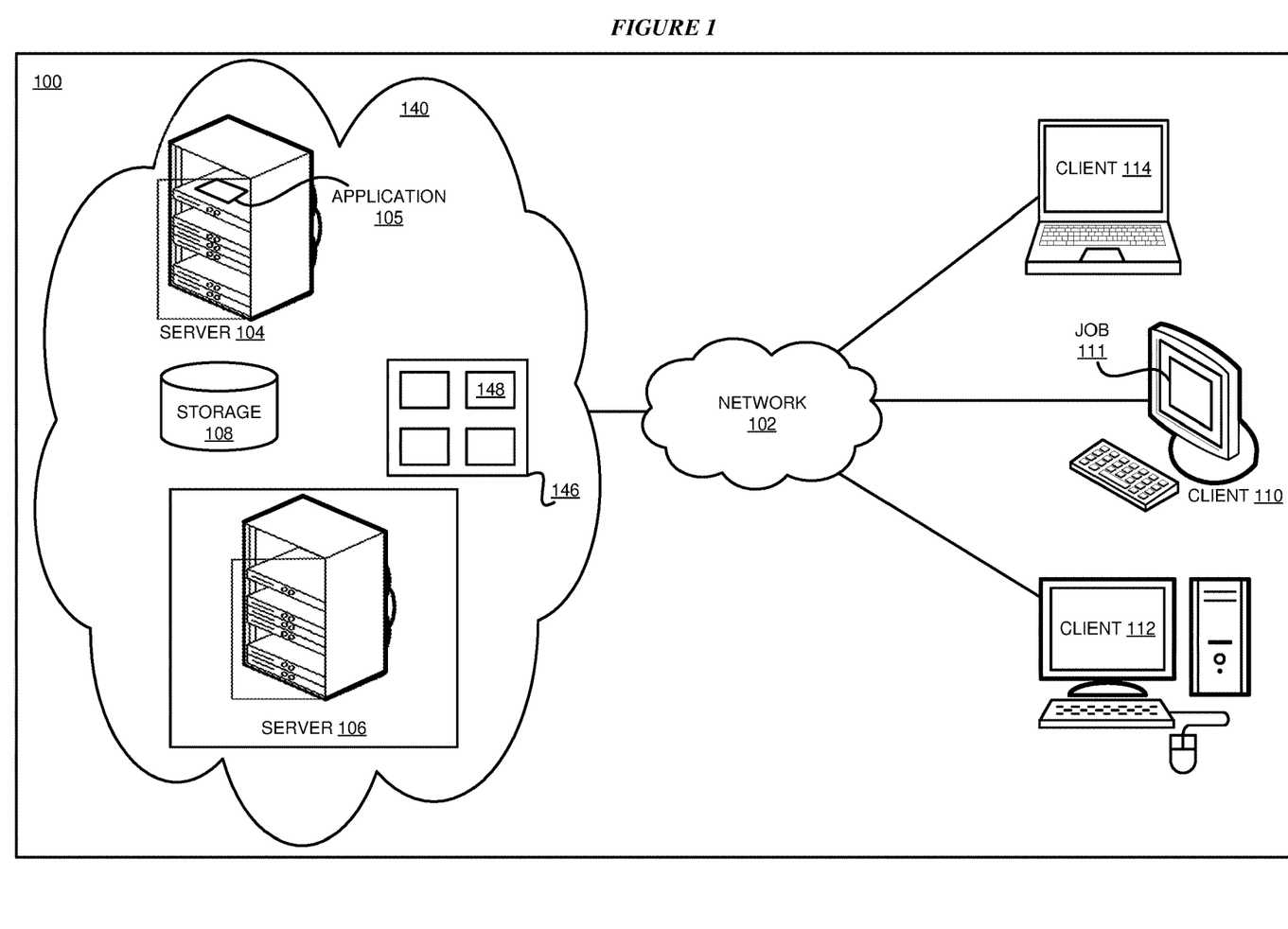
FIG. 1 depicts a block diagram of a network of data processing systems in which illustrative embodiments may be implemented.
Figure 2:
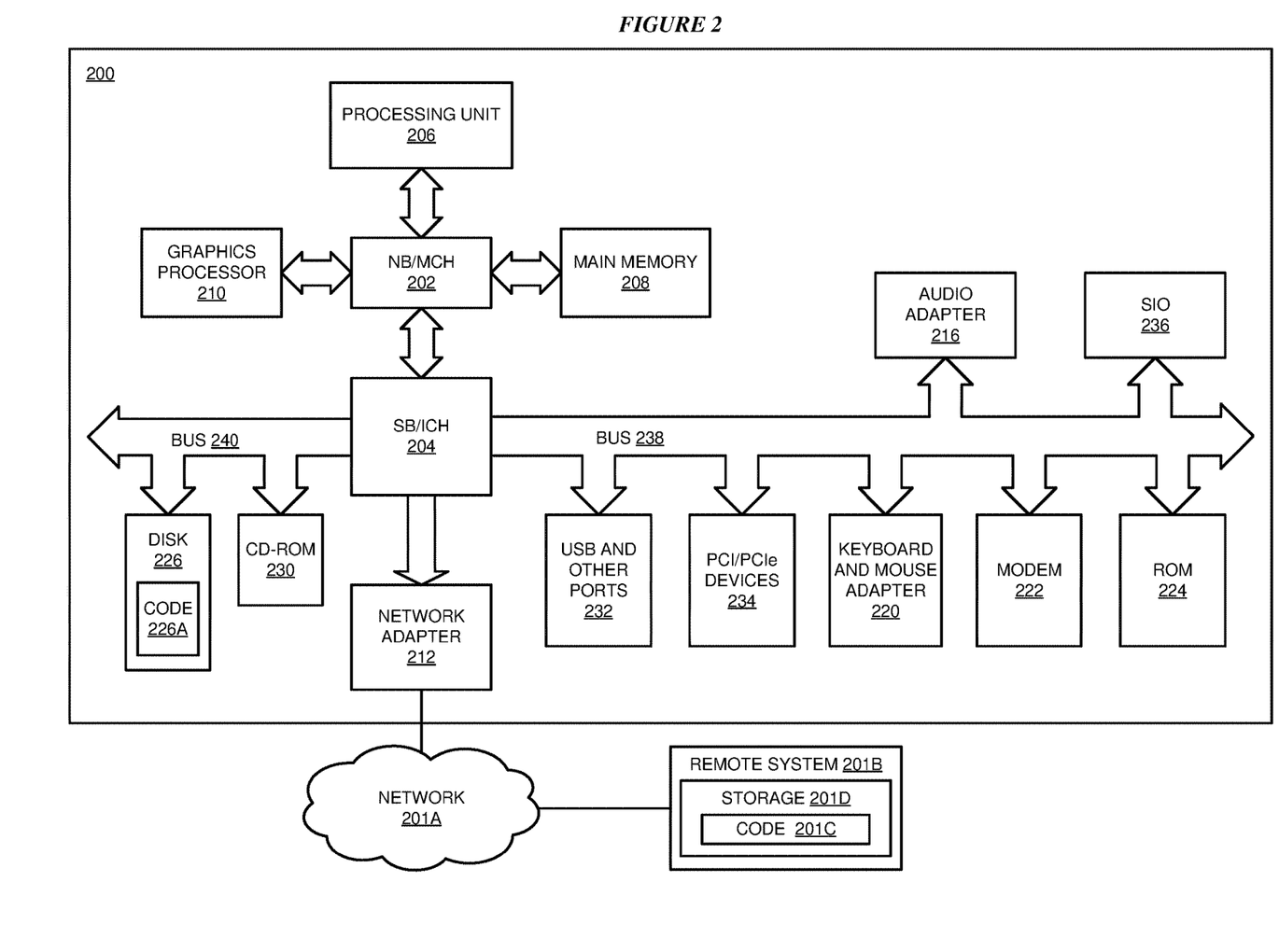
FIG. 2 depicts a block diagram of a conventional data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Cloud 140 is an example of a computing environment described herein. As an example, cloud 140 includes quantum processor 146, which operates on 1 or more qubits 148. Application 105 implements an embodiment described herein. Application 105 operates in any classical computing environment, such as servers 104 and 106 or clients 110, 112, 114, to configure, operate, and obtain results from quantum processor 146. Application 105 stores mutants in storage 108, or in any other suitable storage.

Cloud 140 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 as a whole may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a conventional data processing system in which illustrative embodiments may be implemented. Data processing system 200 is an example of a classical computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as server 104 in FIG. 1 in which computer usable program code or instructions implementing the processes of the illustrative embodiments may be located. Data processing system 200 is described as a computer only as an example, without being limited thereto. Implementations in the form of other devices, such as server 104 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
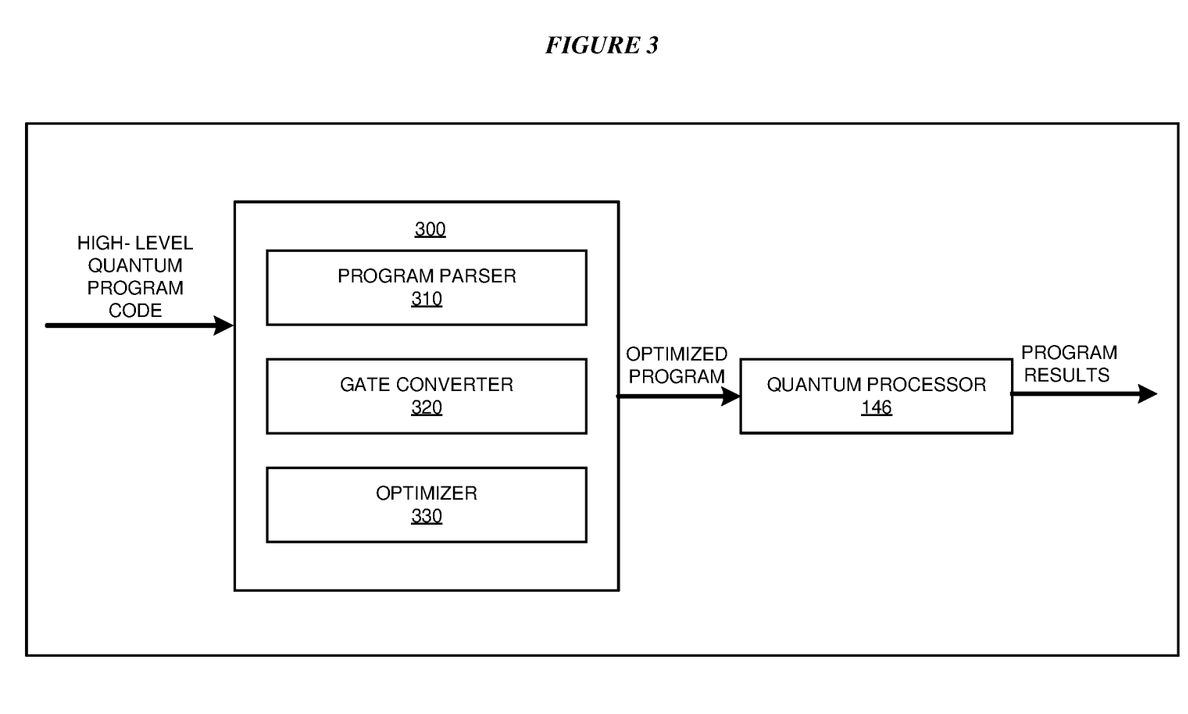
FIG. 3 depicts a block diagram of an example configuration for Monte Carlo Markov Chain based quantum program optimization, and execution of the optimized quantum program, in accordance with an illustrative embodiment.

With reference to FIG. 3, this figure depicts a block diagram of an example configuration for Monte Carlo Markov Chain based quantum program optimization, and execution of the optimized quantum program, in accordance with an illustrative embodiment. Application 300 is an example of application 105 in FIG. 1 and executes in server 104 in FIG. 1, or any other suitable device in FIG. 1.

Application 300 receives a quantum program as an input. Application 300 includes program parser 310, gate converter 320, and optimizer 330. Program parser 310 parses high-level quantum program code into parsed lower-level code. Gate converter 320 maps parsed quantum program code into a quantum program that is executable on a quantum processor. Optimizer 330 transforms the quantum program output from gate converter 320 into a more-optimized quantum program.

Once optimizer 330 determines an optimized quantum program, the program application 300 sends the optimized program to quantum processor 146 for execution Quantum processor 146 is an example of quantum processor 146 in FIG. 1. Quantum processor 146 executes the optimized program and outputs results to any suitable device for further operations.

Figure 4:
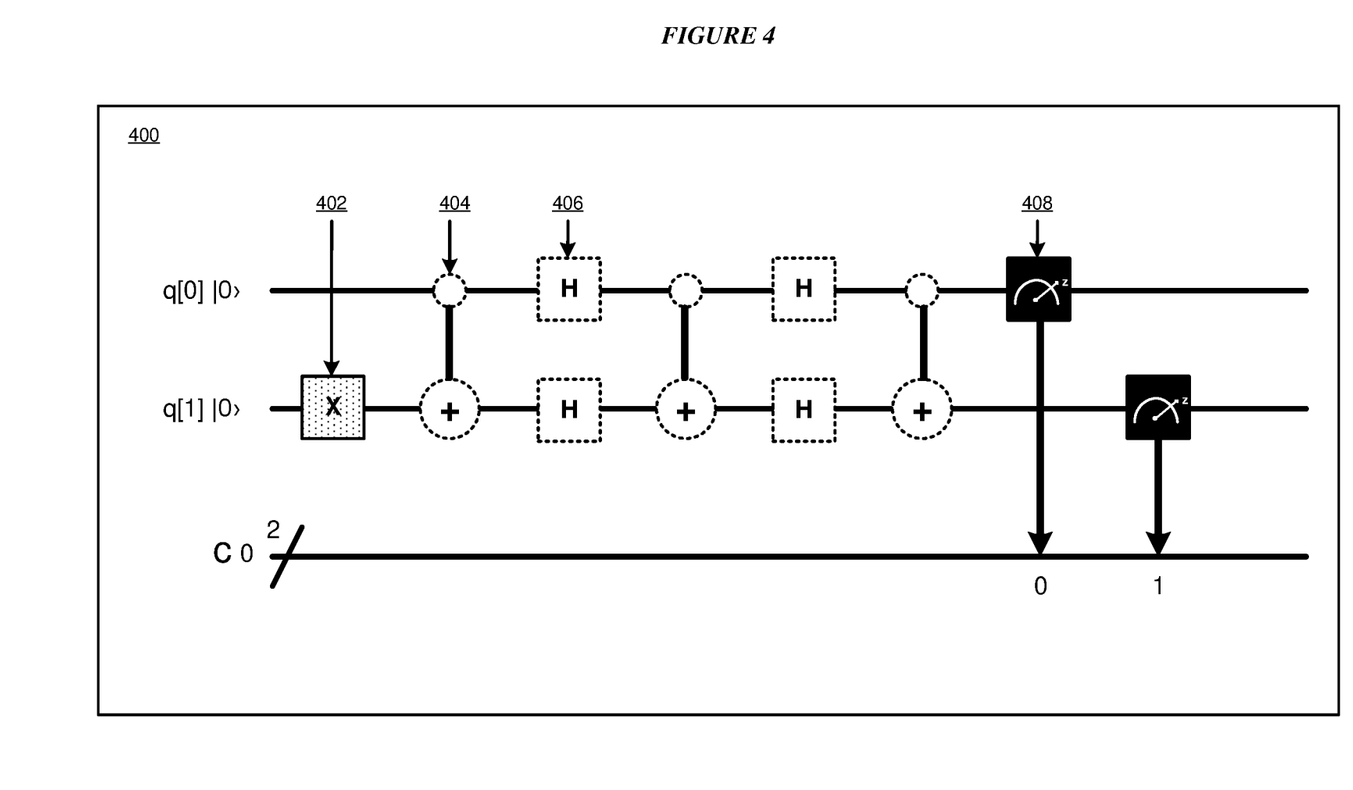
FIG. 4 depicts an example quantum program, a SWAP gate which exchanges the states of two qubits.

FIG. 4 depicts example quantum program 400, a SWAP gate which exchanges the states of qubits q[0] and q[1]. Program 400 includes X gate 402, which inverts the state of a single qubit, here q[1], much like a NOT gate Inverts the state of a single bit in classical computing. Program 400 includes 3 Controlled-NOT, or CNOT, gates 404. Here, q[1] is the target qubit (indicated by a plus sign) and q[0] is the control qubit (indicated by a dot). If the control qubit is in the 1 quantum state, CNOT gate 404 inverts the state of the target qubit. If the control qubit is in the 0 quantum state, CNOT gate 404 does not change the state of the target qubit. Program 400 also includes 4 H gates 406, which put a single qubit into a state of superposition, a combination of the 0 and 1 quantum states. Finally, program 400 includes 2 measurement gates 408, which measure the basis of their respective qubits, producing outputs from program 400. Until qubits are measured, their actual state is not known, and the qubits exist as probability distributions. Program 400 includes 10 operations, and has a depth of 7 when measurement gates 408 operate in parallel.

Figure 5:
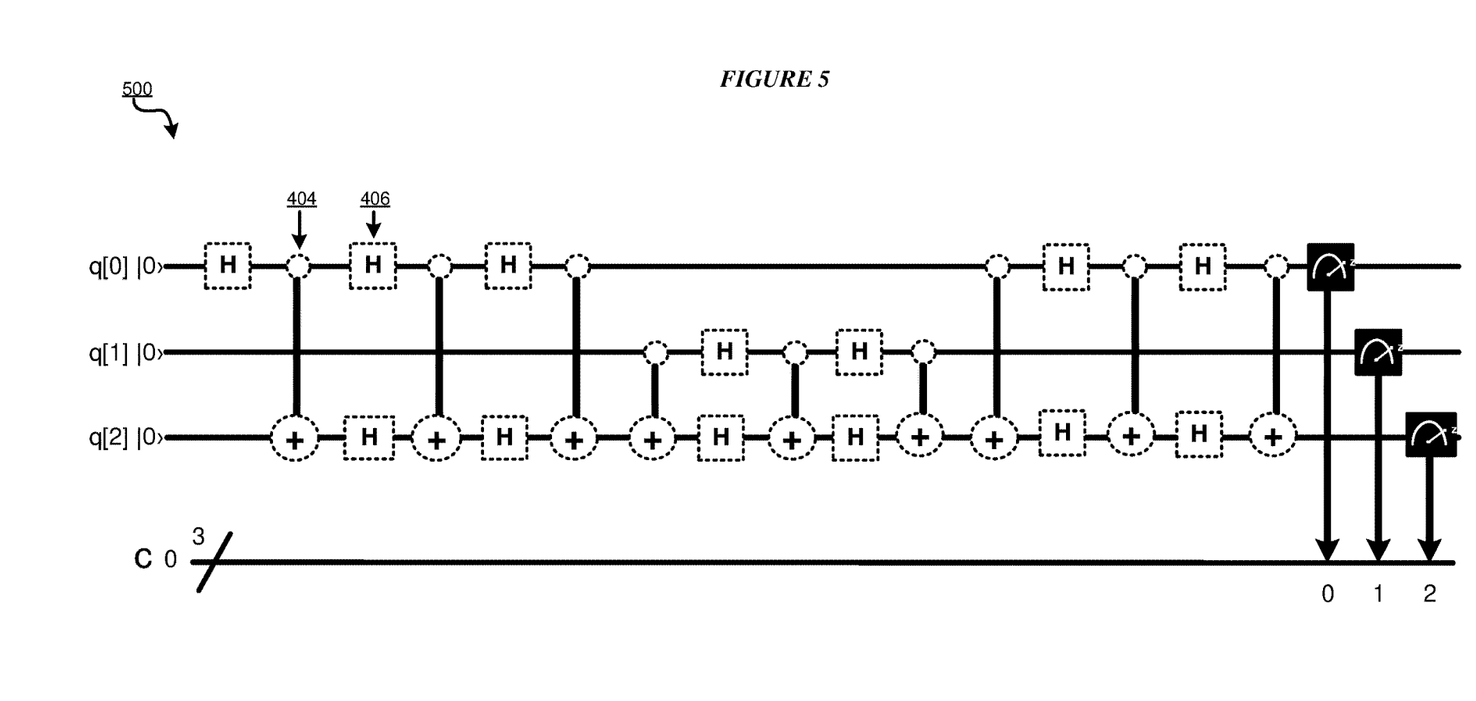
FIG. 5 depicts an example quantum program, a three-qubit program which swaps the states of two qubits.

FIG. 5 depicts example quantum program 500, a three-qubit program which swaps the states of qubits q[0] and q[1]. Program 500 includes 9 CNOT gates 404, 12 H gates 406, and 3 measurement gates 408, each the same as CNOT gates 404, H gates 406, and measurement gates 408 in FIG. 4. Here, in leftmost CNOT gate 404 q[2] is the target qubit and q[0] is the control qubit. Program 500 has 25 operations and a depth of 17 when measurement gates 408 operate in parallel.

Figure 6:
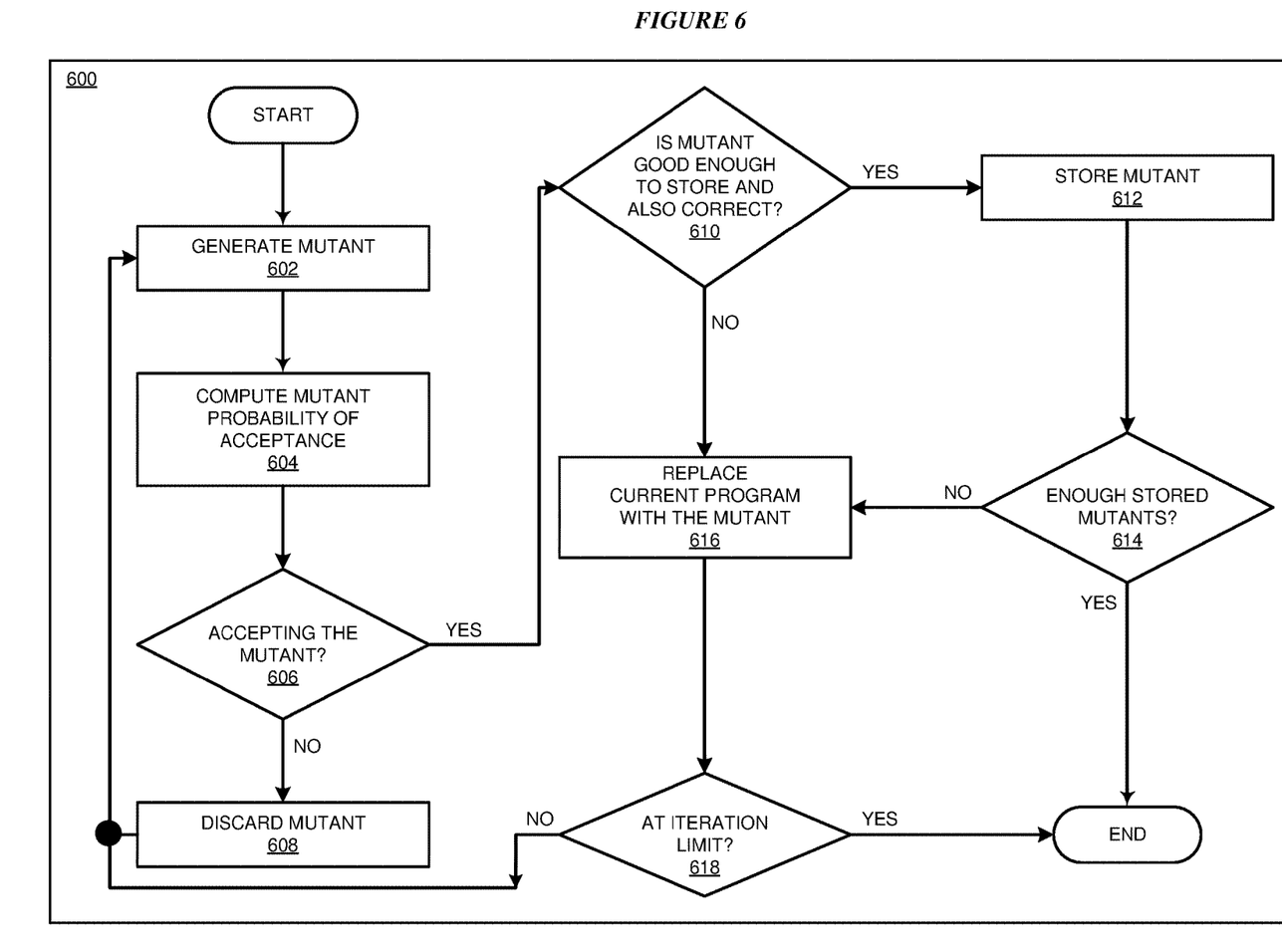
FIG. 6 depicts a flowchart of an example application for Monte Carlo Markov Chain based quantum program optimization, in accordance with an illustrative embodiment.

FIG. 6 depicts a flowchart of an example application 600 for Monte Carlo Markov Chain based quantum program optimization, in accordance with an illustrative embodiment. Application 600 can be implemented in optimizer module 330 of application 300 in FIG. 3.

Application 600 receives a quantum program, for example quantum program 500 in FIG. 5, for optimization. Application 600 introduces one random change to the initial quantum program, generating a first mutant, mutant 1, of the initial program (block 602). Next, application 600 computes mutant 1's probability of acceptance by determining an overall quality score, or cost, of mutant 1 (block 604). Application 600 can compute the mutant's probability of acceptance using any suitable method, including the methods described herein. Next, in block 606, application 600 determines whether to accept mutant 1. If application 600 is not going to accept mutant 1 ("NO" path of block 606), mutant 1 is discarded (block 608), and execution returns to block 602 to generates a new mutant, mutant 2, from the original program.

If application 600 is going to accept mutant 1 ("YES" path of block 606), application 600 checks whether mutant 1 has a quality score above a threshold, or a cost below a threshold, and is also correct (block 610). If so ("YES" path of block 610), the application saves mutant 1, as well as mutant 1's score or cost, in a collection of "good enough" mutants (block 612). Then, optionally, the application checks whether there are enough stored "good enough" mutants (block 614) and, if so ("YES" path of block 614), ends. If not, or if block 614 is not performed, the application replaces the original program with mutant 1 (block 616). Then the application checks whether the number of iterations of mutant generation have reached an iteration limit (block 618). If so ("YES" path of block 618), the application ends. If not ("NO" path of block 618, execution returns to block 602 to generates a new mutant, mutant 2, from mutant 1. Application 600 continues execution in this manner until a mutant limit (block 614) or an iteration limit (block 618) is reached.

Figure 7:
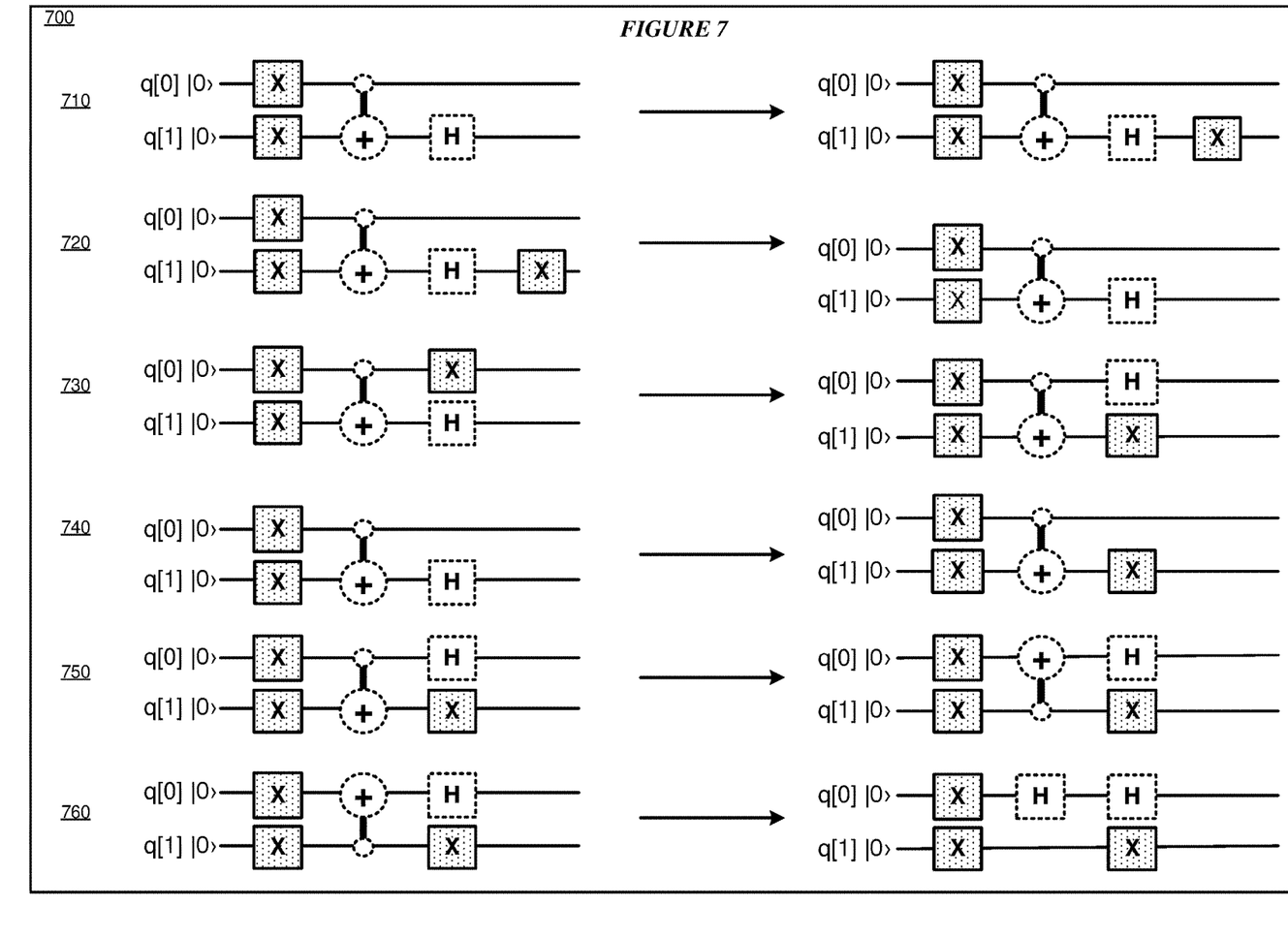
FIG. 7 depicts examples of the transformations used to generate mutants, in accordance with an illustrative embodiment.

FIG. 7 depicts examples of the transformations used to generate mutants in block 602 of application 600 in FIG. 6, in accordance with an illustrative embodiment. Each of the programs depicted in FIG. 7 depicts X gates, control gates, and H gates, which are the same as X gate 402, control gate 404, and H gate 406 in FIG. 4.

In particular, example 710 depicts the insertion, at a random program point, of an operation synthesized by randomly choosing a type of gate and the qubits the gate operates on. Here, example 710 inserts an additional X gate. Example 720 depicts removal of a randomly chosen operation. Here, example 720 removes an X gate. Example 730 depicts a swap of two randomly chosen operations, here a swap of an X gate and an H gate. Example 740 depicts a gate replacement, here a replacement of an H gate with an X gate. Example 750 depicts an existing operation with existing qubit inputs replaced by other qubit inputs. Here, example 750 shows the control and target qubits of a control gate swapped. Example 760 depicts replacement of an existing operation, including gate and qubits, with an different randomly synthesized operation. Here, example 760 shows the control gate operating on q{0} and q[1] replaced by an H gate operating only on q[0].

Figure 8:
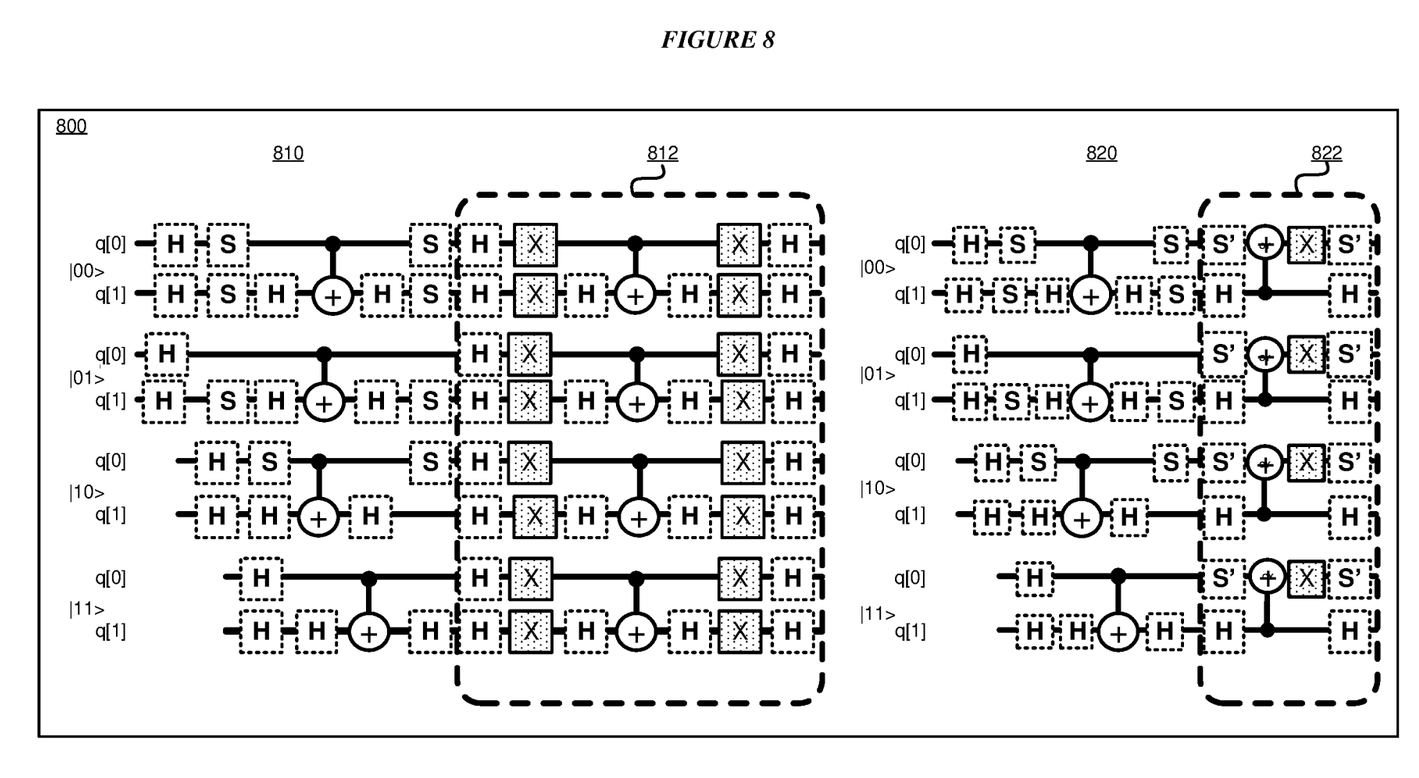
FIG. 8 depicts example original and optimized quantum programs, in accordance with an illustrative embodiment.

FIG. 8 depicts example original and optimized quantum programs, in accordance with an illustrative embodiment. In particular, program 810 depicts four implementations of the Grover's Search algorithm for searching for the |00}, |01}, |10}, and |11} states respectively. For example, when searching for the |00} quantum state, program 810 returns "true" if an input matches the |00} quantum state, and "false" otherwise. Program 810 works similarly for the other three possible quantum states. Program 810 shows that all four implementations share the same amplification structure (outlined by box 812), which has 7 steps, or a depth of 7, and 11 gates in total. Program 820 depicts an optimized version of program 810, with the optimized amplification structure (outlined by box 822) having only 4 steps and 6 gates, 3 steps and 5 gates smaller than program 810.

Thus, a computer implemented method, system or apparatus, and computer program product are provided in the illustrative embodiments for Monte Carlo Markov Chain based quantum program optimization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   iterating, until reaching an iteration limit, actions comprising:
   generating, from a quantum program using a processor and a memory, a first mutant, the first mutant comprising a transformation of the quantum program, wherein the quantum program comprises a set of operations, each operation in the set of operations specifying at least one gate operating on at least one qubit, wherein the transformation comprises inserting, into the set of operations, a synthesized operation comprising an instance of a gate type and at least one qubit on which the instance operates, wherein an insertion point, the gate type, and the at least one qubit of the synthesized operation are randomly selected;
   computing a quality score, a correctness distance, and a probability of acceptance corresponding to the first mutant;
   replacing, upon determining that the probability of acceptance exceeds an acceptance threshold, the quantum program with the first mutant;
   storing, upon determining that the quality score exceeds a storage threshold and that the correctness distance is zero, the first mutant in a collection of acceptable mutants; and
   terminating, responsive to a number of mutants in the collection of acceptable mutants reaching a threshold number greater than one, the iterating.

2. The method of claim 1, further comprising:
   computing the quality score using an inverse proportionality function on an overall cost.

3. The method of claim 2, wherein:
cost_diff comprises the overall cost corresponding to the mutant minus an overall cost corresponding to the original program;
the probability of acceptance is one when cost_diff is a negative number; and
the probability of acceptance is e^(-beta*cost_diff) when cost_diff is a positive number, wherein beta comprises a tunable parameter.

4. The method of claim 2, wherein the overall cost further comprises a correctness cost and a performance cost.

5. The method of claim 1, further comprising:
computing the probability of acceptance using a direct proportionality function on the quality score.

6. The method of claim 1, wherein:
quality_diff comprises the quality score corresponding to the mutant minus a quality score corresponding to the original program;
the probability of acceptance is one when quality_diff is a positive number; and
the probability of acceptance is e^(betequality_diff) when quality_diff is a negative number, wherein beta comprises a tunable parameter.

7. The method of claim 1, further comprising:
terminating the iterating upon determining that the quality score exceeds a storage threshold and that the correctness distance is zero.

8. A computer usable program product comprising a computer-readable storage medium, and program instructions stored on the computer-readable storage medium, the stored program instructions comprising:
program instructions to iterate, until reaching an iteration limit, actions comprising:
program instructions to generate, from a quantum program using a processor and a memory, a first mutant, the first mutant comprising a transformation of the quantum program, wherein the quantum program comprises a set of operations, each operation in the set of operations specifying at least one gate operating on at least one qubit, wherein the transformation comprises inserting, into the set of operations, a synthesized operation comprising an instance of a gate type and at least one qubit on which the instance operates, wherein an insertion point, the gate type, and the at least one qubit of the synthesized operation are randomly selected;
program instructions to compute a quality score, a correctness distance, and a probability of acceptance corresponding to the first mutant;
program instructions to replace, upon determining that the probability of acceptance exceeds an acceptance threshold, the quantum program with the first mutant;
program instructions to store, upon determining that the quality score exceeds a storage threshold and that the correctness distance is zero, the first mutant in a collection of acceptable mutants; and
program instructions to terminate, responsive to a number of mutants in the collection of acceptable mutants reaching a threshold number greater than one, the iterating.

9. The computer usable program product of claim 8, further comprising:
program instructions to compute the quality score using an inverse proportionality function on an overall cost.

10. The computer usable program product of claim 9, wherein:
cost_diff comprises the overall cost corresponding to the mutant minus an overall cost corresponding to the original program;
the probability of acceptance is one when cost_diff is a negative number; and
the probability of acceptance is e^(-beta*cost_diff) when cost_diff is a positive number, wherein beta comprises a tunable parameter.

11. The computer usable program product of claim 9, wherein the overall cost further comprises a correctness cost and a performance cost.

12. The computer usable program product of claim 8, further comprising:
program instructions to compute the probability of acceptance using a direct proportionality function on the quality score.

13. The computer usable program product of claim 8, wherein:
quality_diff comprises the quality score corresponding to the mutant minus a quality score corresponding to the original program;
the probability of acceptance is one when quality_diff is a positive number; and
the probability of acceptance is e^(beta*quality_diff) when quality_diff is a negative number, wherein beta comprises a tunable parameter.

14. The computer usable program product of claim 8, further comprising program instructions to terminate the iterating upon determining that the quality score exceeds a storage threshold and that the correctness distance is zero.

15. The computer usable program product of claim 8, wherein the stored program instructions are stored in a computer readable storage medium in a data processing system, and wherein the stored program instructions are transferred over a network from a remote data processing system.

16. The computer usable program product of claim 8, wherein the stored program instructions are stored in a computer readable storage medium in a server data processing system, and wherein the stored program instructions are downloaded over a network to a remote data processing system for use in a computer readable storage medium associated with the remote data processing system.

17. A computer system comprising one or more processors, one or more computer-readable memories, and a computer-readable storage medium, and program instructions stored on the computer-readable storage medium for execution by at least one of the one or more processors via at least one of the one or more memories, the stored program instructions comprising:
program instructions to iterate, until reaching an iteration limit, actions comprising:
program instructions to generate, from a quantum program using a processor and a memory, a first mutant, the first mutant comprising a transformation of the quantum program, wherein the quantum program comprises a set of operations, each operation in the set of operations specifying at least one gate operating on at least one qubit, wherein the transformation comprises inserting, into the set of operations, a synthesized operation comprising an instance of a gate type and at least one qubit on which the instance operates, wherein an insertion point, the gate type, and the at least one qubit of the synthesized operation are randomly selected;

program instructions to compute a quality score, a correctness distance, and a probability of acceptance corresponding to the first mutant;

program instructions to replace, upon determining that the probability of acceptance exceeds an acceptance threshold, the quantum program with the first mutant;

program instructions to store, upon determining that the quality score exceeds a storage threshold and that the correctness distance is zero, the first mutant in a collection of acceptable mutants; and program instructions to terminate, responsive to a number of mutants in the collection of acceptable mutants reaching a threshold number greater than one, the iterating.

18. The computer system of claim 17, further comprising:
program instructions to compute the quality score using an inverse proportionality function on an overall cost.

* * * * *